(12) United States Patent
Hornick et al.

(10) Patent No.: US 7,748,490 B2
(45) Date of Patent: Jul. 6, 2010

(54) HANDS-FREE POWERED MOBILITY DEVICE

(75) Inventors: M. Jeffrey Hornick, Riverview, FL (US); Merry Lynn Morris, Tampa, FL (US); Scott Bayus, Tampa, FL (US); Erin Smalley, Zephyrhills, FL (US); Tolga Akkoc, Ankara (TR); Konstantin Popov, Lutz, FL (US); Peter Schrock, Sarasota, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 12/146,944

(22) Filed: Jun. 26, 2008

(65) Prior Publication Data

US 2009/0000850 A1 Jan. 1, 2009

Related U.S. Application Data

(60) Provisional application No. 60/946,231, filed on Jun. 26, 2007.

(51) Int. Cl.
*B60K 26/00* (2006.01)
(52) U.S. Cl. ........................... 180/316; 180/333
(58) Field of Classification Search .............. 180/316, 180/6.5, 8.2, 8.3, 8.1, 7.1, 282, 65.1, 21, 180/333, 218
See application file for complete search history.

(56) References Cited

U.S. PATENT DOCUMENTS

| 4,059,786 A | 11/1977 | Jones et al. |
| 4,243,923 A | 1/1981 | Whitney et al. |
| 4,951,766 A * | 8/1990 | Basedow et al. ............. 180/6.5 |
| 5,349,881 A * | 9/1994 | Olorenshaw et al. ... 74/471 XY |
| 5,364,120 A | 11/1994 | Shimansky |
| 5,379,663 A * | 1/1995 | Hara ...................... 74/471 XY |
| 5,555,949 A | 9/1996 | Stallard et al. |
| 5,592,997 A | 1/1997 | Ball |

(Continued)

FOREIGN PATENT DOCUMENTS

WO 1997028775 A1 8/1997

OTHER PUBLICATIONS

Joseph, T.; Hung Nguyen. "Neural network control of wheelchairs using telemetric headmovement." Engineering in Medicine and Biology Society. 1998. 20th Annual International Conference of the IEEE. vol. 5. Oct. 28-Nov. 1, 1998. pp. 2731-2733.

(Continued)

*Primary Examiner*—Ruth Ilan
*Assistant Examiner*—Keith Frisby
(74) *Attorney, Agent, or Firm*—Jeremy Spier; Smith & Hopen, P.A.

(57) ABSTRACT

An electrically operable wheelchair having a seat, a base with a pair of motors respectively coupled with the main support wheels, a position detection assembly, and a controller coupled with the position detection assembly and the motors for controlling wheelchair operation in order to effect desired wheelchair movements. The hands-free input device of the invention, which includes the position detection assembly and a position detection device, provides input signals representative of desired wheelchair movements to the controller. The position detection device detects the position of the seat. Movement of the seat, rather than a joystick, creates the voltage signals which are then transmitted to the wheelchair controller.

11 Claims, 10 Drawing Sheets

U.S. PATENT DOCUMENTS

| | | |
|---|---|---|
| 5,690,185 A | 11/1997 | Sengel |
| D397,645 S | 9/1998 | Schaffner |
| D404,693 S | 1/1999 | Schaffner |
| 5,944,131 A | 8/1999 | Schaffner et al. |
| 6,129,165 A | 10/2000 | Schaffner et al. |
| 6,176,335 B1 | 1/2001 | Schaffner et al. |
| 6,186,252 B1 | 2/2001 | Schaffner et al. |
| 6,199,647 B1 | 3/2001 | Schaffner et al. |
| 6,460,639 B1 * | 10/2002 | Hori et al. .................... 180/6.2 |
| 6,651,766 B2 | 11/2003 | Kamen et al. |
| 6,902,177 B2 | 6/2005 | Lindsay et al. |
| 6,992,602 B2 | 1/2006 | Alexander et al. |
| 7,004,271 B1 * | 2/2006 | Kamen et al. ................. 180/21 |
| 7,080,710 B2 | 7/2006 | Kwon et al. |
| 7,216,935 B2 | 5/2007 | Wegener |
| 7,275,607 B2 | 10/2007 | Kamen et al. |
| 2006/0260862 A1 | 11/2006 | Nishikawa |
| 2008/0048515 A1 * | 2/2008 | Waggoner et al. ........... 310/103 |

OTHER PUBLICATIONS

Felzer, T.; Freisleben, B. "HaWCoS: the "hands-free" wheelchair control system." Fifth International ACM Conference on Assistive Technologies. 2002. pp. 127-134.

Jia, Pei; Hu, Huosheng H.; Lu, Tao; Yuan, Kui. "Head gesture recognition for hands-free control of an intelligent wheelchair." Industrial Robot: An International Journal. vol. 34. No. 1. 2007. pp. 60-68.

* cited by examiner

HANDS-FREE POWERED MOBILITY DEVICE

CROSS REFERENCE TO RELATED APPLICATIONS

This application is a Non-Provisional Application of co-pending U.S. Provisional Application No. 60/946,231 filed Jun. 26, 2007, which is incorporated herein by reference.

FIELD OF INVENTION

This invention relates to a powered mobility device, such as a wheelchair, which is controlled by movement of the upper body, eliminating the need for hand control.

BACKGROUND OF THE INVENTION

Most motorized wheelchairs use a manual controller such as a joystick, chin controls or puff/sip scanners. In the case of a joystick controller, by way of example, a manually-engageable control lever is mounted on the arm of the wheelchair. The joystick is then pushed forwardly or rearwardly to respectively energize the drive wheels to carry out forward or rearward driving of the wheelchair. Lateral movement of the joystick, that is rightwardly or leftwardly, causes corresponding rightward or leftward steering of the wheelchair resulting from the corresponding adjustment in the motors driving the right and left wheels.

Traditionally, joystick controllers were of the inductive type which were well known and used for many years. That is, the lower end of the joystick mounted to a coil which was positioned between four stationary coils arranged in a generally rectangular pattern. The four stationary coils represented the forward, rearward, rightward and leftward directions. Movement of the joystick and its associated coil created, in the stationary coils to which the moving coil approached, appropriate voltage signals which were then transmitted to the wheelchair controller. This in turn appropriately drove the motors associated with the right and left drive wheels.

Wheelchair controllers have advanced. For example, U.S. Pat. No. 6,992,602 describes a joystick controller employing a non-contact principle for detecting joystick position. Specifically, the joystick controller using Hall-effect sensors or other magnetic proximity effect devices. The signals from the joystick are then sent to traditional control logic processors, as is known in the art.

A conventional wheelchair, such as the JAZZY™ 1120 made by Pride Mobility Products Corporation and described in U.S. Pat. No. 6,176,335, is shown in FIG. 1. This wheelchair is widely used and serves as an ideal context for the invention as described below. The wheelchair of the prior art includes electrically operable wheelchair 1 having seat 2, base 4 with a pair of motors (not shown) respectively coupled with the main support wheels 6, input device 8 (here a joystick), and a controller (not shown) coupled with input device 8 and the motors for controlling wheelchair operation in order to effect desired wheelchair movements. It can be seen from FIG. 1 that seat 2 is rigidly affixed to base 4.

Traditional and modern joystick controllers, while providing the greatest degree of control, do not provide hands-free control.

SUMMARY OF INVENTION

This invention includes a device for the hands-free control of a powered mobility device, such as a wheelchair. The invention utilizes an omni-directional base assembly equipped with position sensors to control movement of the mobility device. The device's controller has an input for receiving specification by a user of a value based on the mechanically detected body orientation of the user. The controller generates movement command signals based on user-position specified direction and velocity values.

In one embodiment, the invention includes an electrically operable wheelchair having a seat, a base with a pair of motors respectively coupled with the main support wheels, a position detection assembly, and a controller coupled with the position detection assembly and the motors for controlling wheelchair operation in order to effect desired wheelchair movements. The hands-free input device of the invention, which includes the position detection assembly and a position detection device, provides input signals representative of desired wheelchair movements to the controller.

The position detection assembly allows the seat to move, i.e. pivot, from its center position and allows the user to control the movement of the wheelchair using movement of the upper body. Pivotal movement is provided left to right as well as forward to backward and movement in such directions can be simultaneous.

The position detection assembly can also include a biasing system for returning the wheelchair seat to a centered position when force is not applied in any direction. In one embodiment, the biasing system includes four compression springs located in each of the four directions of tilt. To keep the chair in the neutral position, these springs provide a constant upward force on the brackets. If an individual has limited upper body control, these springs will give feedback resistance to aid in returning the user to the neutral position.

The position detection device is used to detect the position of the seat. Movement of the seat, rather than a joystick, creates the voltage signals which are then transmitted to the wheelchair controller.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention includes a device for the hands-free control of a powered mobility device, such as a wheelchair. The invention utilizes an omni-directional base assembly equipped with position sensors to control movement of the mobility device. The controller has an input for receiving specification by a user of a value based on the mechanically detected body orientation of the user. The controller generates movement command signals based on user-position specified direction and velocity values.

Figure 1:
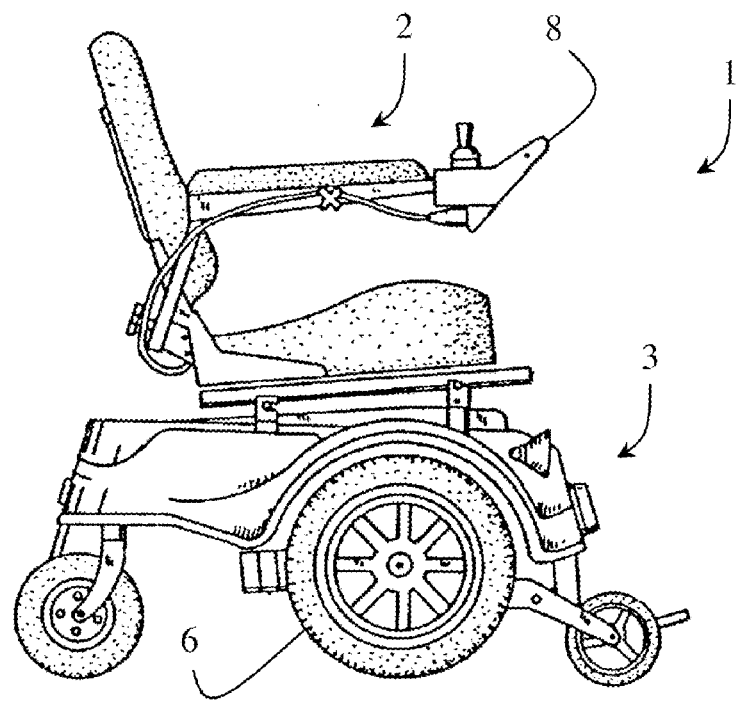
FIG. 1 is a side view of a conventional power wheelchair.
Figure 2:
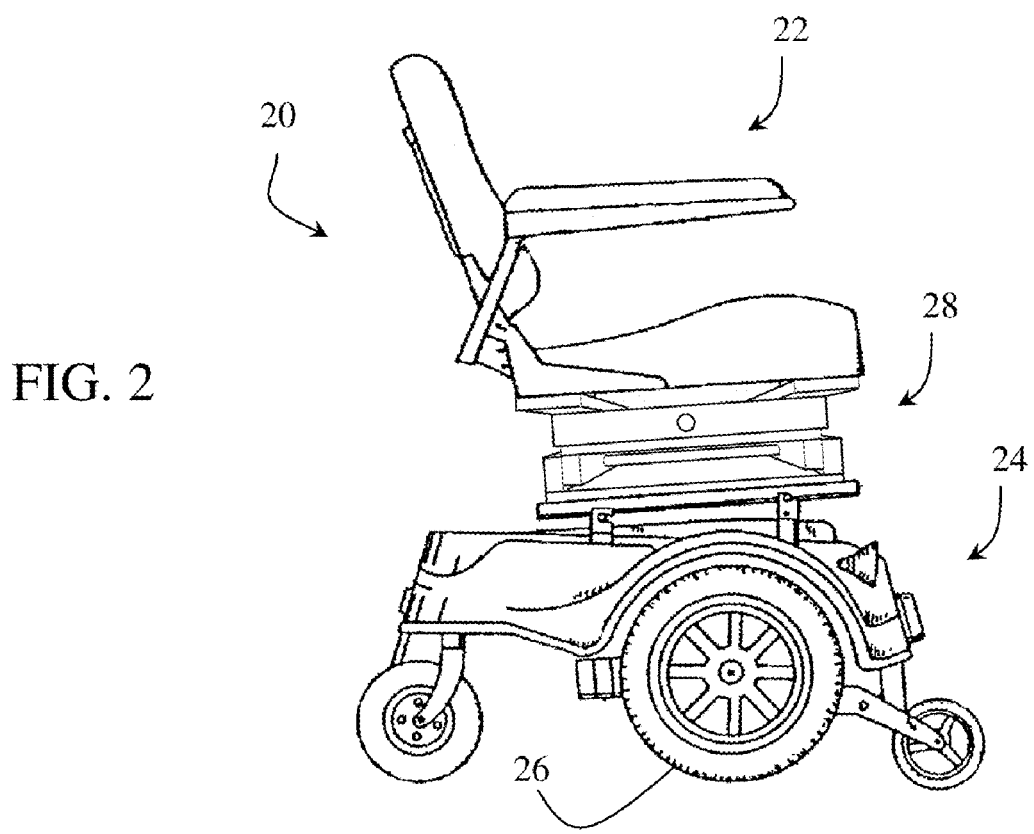
FIG. 2 is a side view of an embodiment of the position detection assembly of the present invention incorporated into an existing conventional power wheelchair.

In an illustrative embodiment, shown in FIG. 2, the invention includes electrically operable wheelchair 20 having seat 22, base 24 with a pair of motors (not shown) respectively coupled with the main support wheels 26, position detection assembly 28, and a controller (not shown) coupled with the position detection assembly and the motors for controlling wheelchair operation in order to effect desired wheelchair movements. The hands-free input device of the invention, which includes position detection assembly 28 and a position detection device, provides input signals representative of desired wheelchair movements to the controller.

Figure 3A:
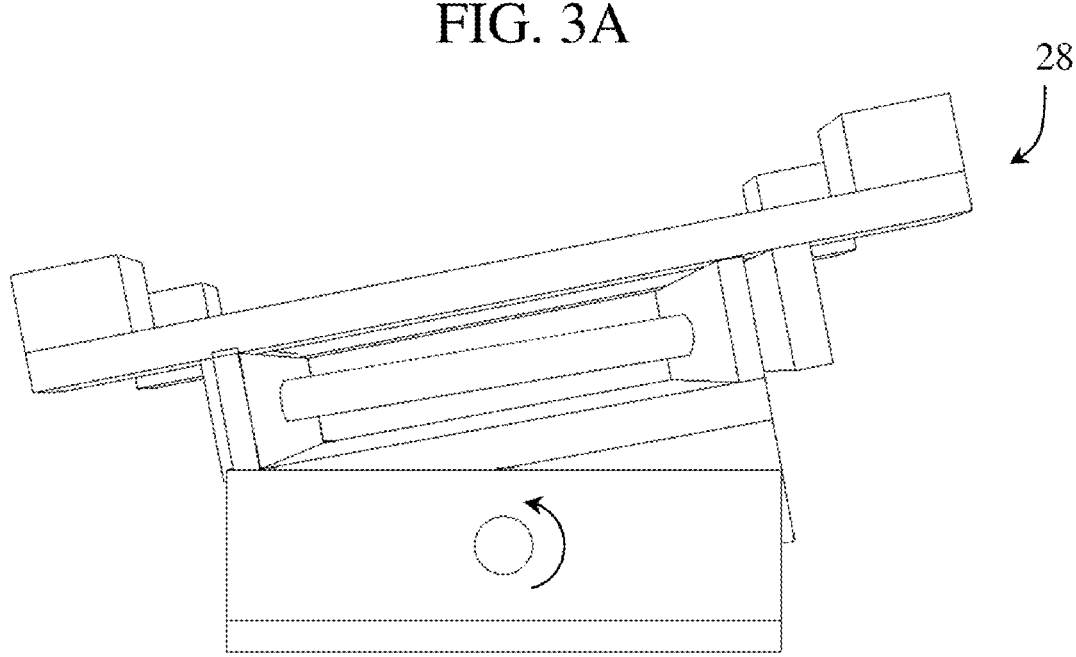
FIG. 3A is a front view of an embodiment of the position detection assembly of the present invention showing the pivotal movement provided from left to right, along the x-axis.
Figure 3B:
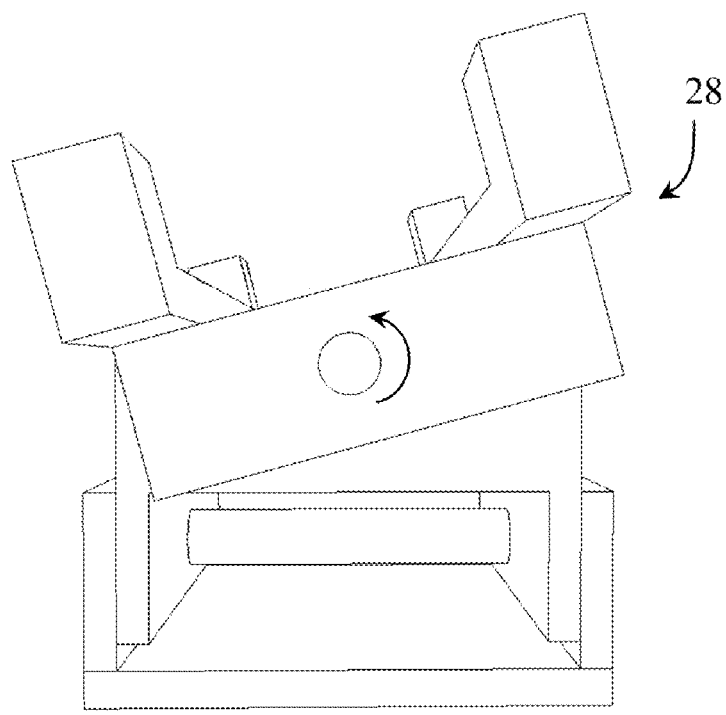
FIG. 3B is a side view of an embodiment of the position detection assembly of the present invention showing the pivotal movement provided from front to back, along the y-axis.

Position detection assembly 28 allows seat 22 to move, i.e. pivot, from its center position. Pivotal movement is provided left to right, referred to herein as movement along the x-axis (FIG. 3A) as well as forward to backward referred to herein as movement along the y-axis (FIG. 3B). Pivotal movement along the x or y axis is not mutually exclusive. Position detection assembly 28 provides for movement along the x-axis which is simultaneous with movement along the y-axis.

The invention shown in FIGS. 2-3B is provide by way of example only. FIGS. 2-3B are not intended to show scale or any relative proportions. Rather, position detection assembly 28 is enlarged for ease of viewing. One of skill in the art will recognize the desire to keep the components of position detection assembly 28 as compact as possible to reduce the additional height of seat 22.

Position Detection Assembly

Figure 4A:
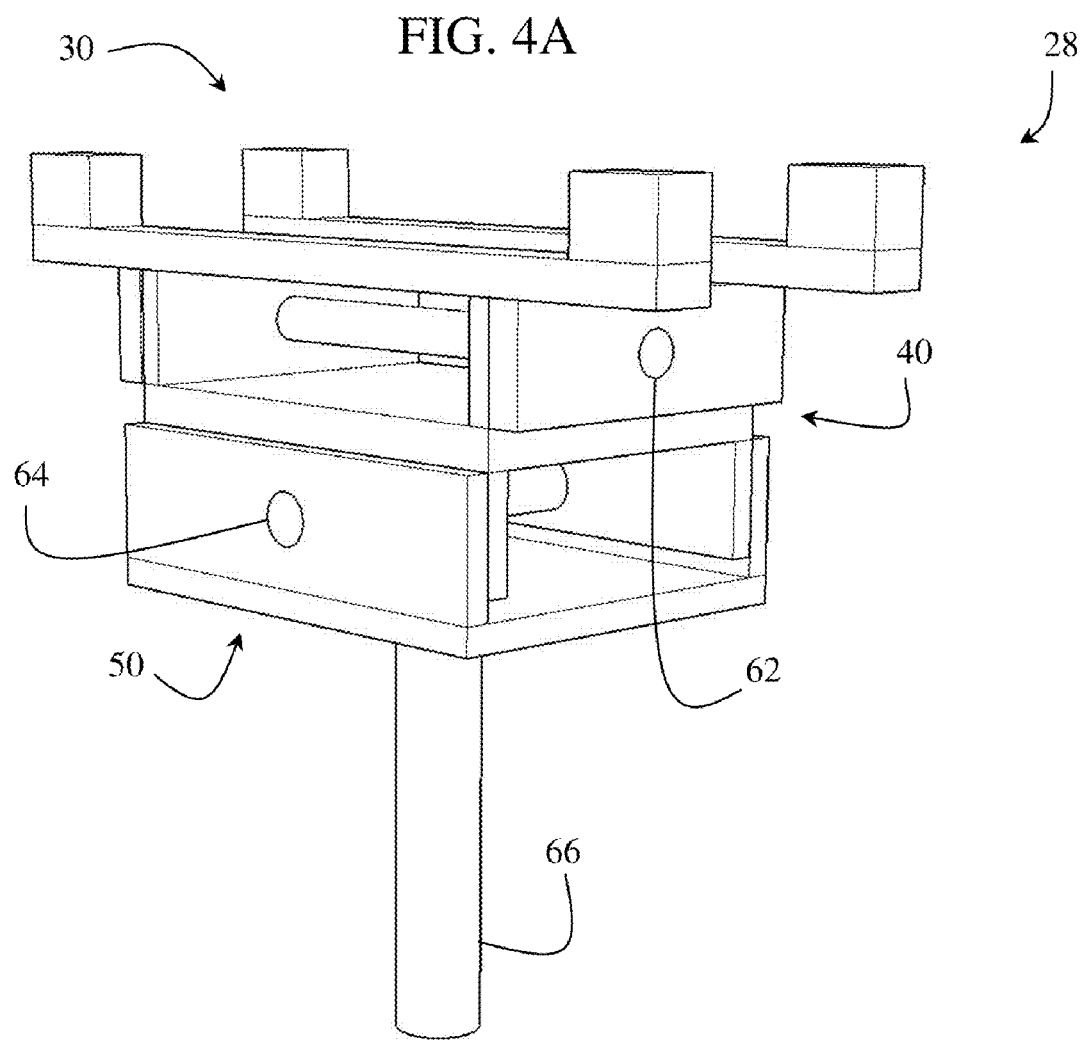
FIG. 4A is a perspective view of an embodiment of the position detection assembly of the present invention.
Figure 4B:
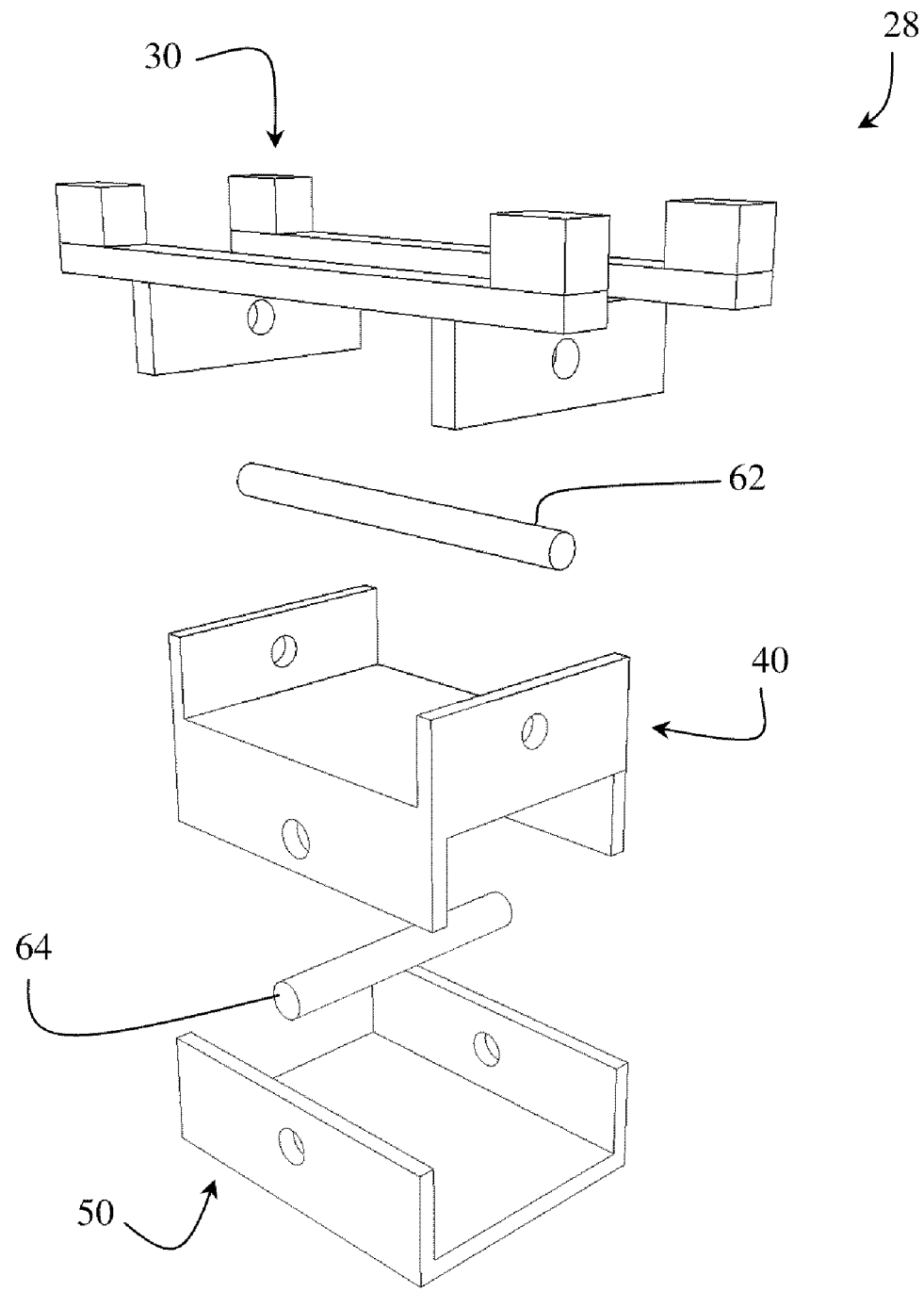
FIG. 4B is an exploded perspective view of an embodiment of the position detection assembly of the present invention.

An illustrative position detection assembly is shown in greater detail in FIGS. 4A-7C. As shown in FIG. 4A, position detection assembly 28 further includes top bracket 30, middle bracket 40 and bottom bracket 50. Top bracket 30 is pivotally connected to middle bracket 40 by upper axle 62. Middle bracket 40 is pivotally connected to bottom bracket 50 by lower axle 64. Upper axle 62 and lower axle 64 are substantially perpendicular. FIG. 4B is an exploded view of position detection assembly 28.

Connecting rod 66 can be used to mount the position detection assembly to pre-existing wheelchairs (or other mobility device) for retro-fit applications. It is also possible to mount lower bracket 50 directly to the wheelchair frame.

Figure 5A:
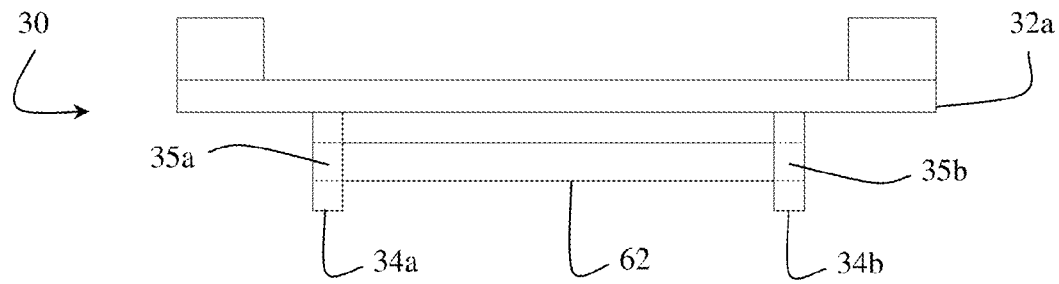
FIG. 5A is a front view of the top bracket of an embodiment of the position detection assembly of the present invention.
Figure 5B:
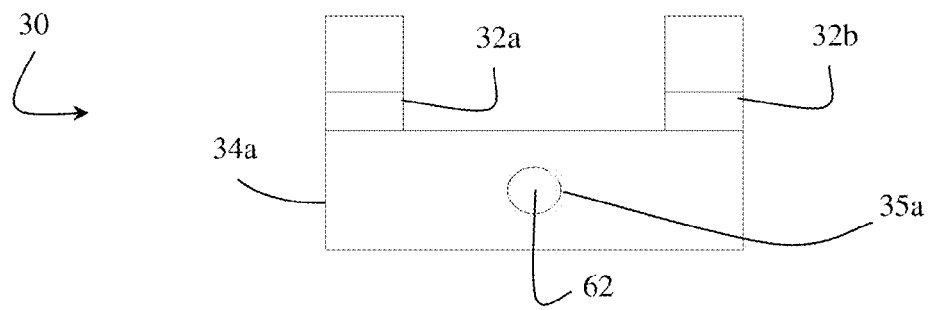
FIG. 5B is a side view of the top bracket of an embodiment of the position detection assembly of the present invention.
Figure 5C:
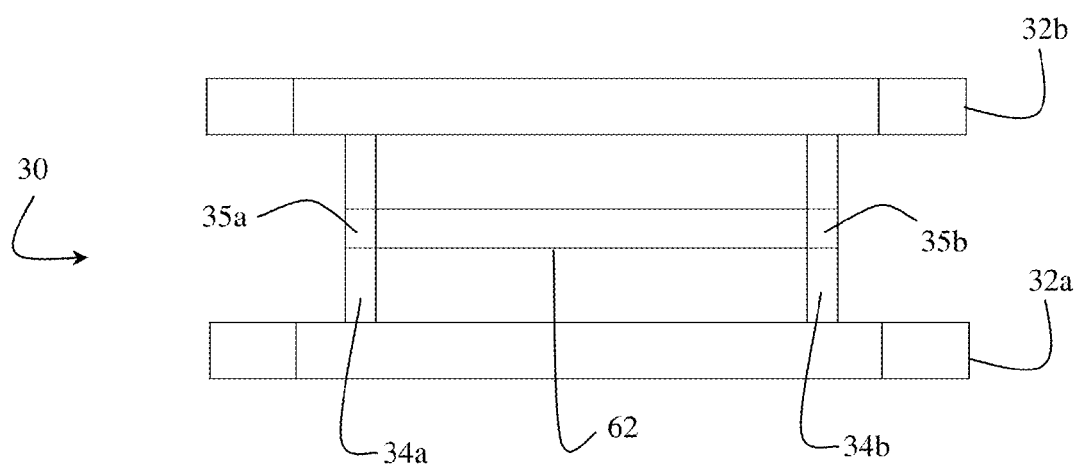
FIG. 5C is a top view of the top bracket of an embodiment of the position detection assembly of the present invention.

As previously discussed, the position detection assembly allows the user to control the movement of the wheelchair using movement of the upper body. Top bracket 30, shown in FIGS. 5A (front view), 5B (side view), and 5C (top view), pivots approximately five degrees from center (forward to backward) on upper axle 62. Upper bracket 30, as shown in FIGS. 5A-5C, includes a pair of transverse supports 32a and 32b connected by upper bracket side supports 34a and 34b. Upper bracket supports 34a and 34b further include central bores 35a and 35b which receive the ends of upper axle 62.

Figure 6A:
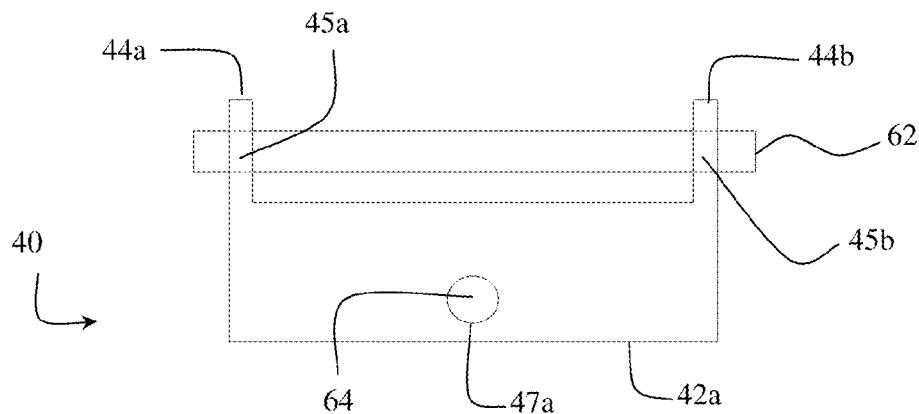
FIG. 6A is a front view of the middle bracket of an embodiment of the position detection assembly of the present invention.
Figure 6B:
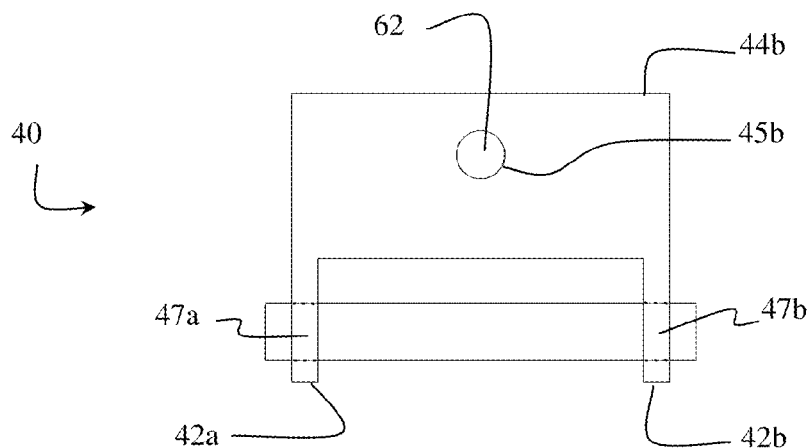
FIG. 6B is a side view of the middle bracket of an embodiment of the position detection assembly of the present invention.
Figure 6C:
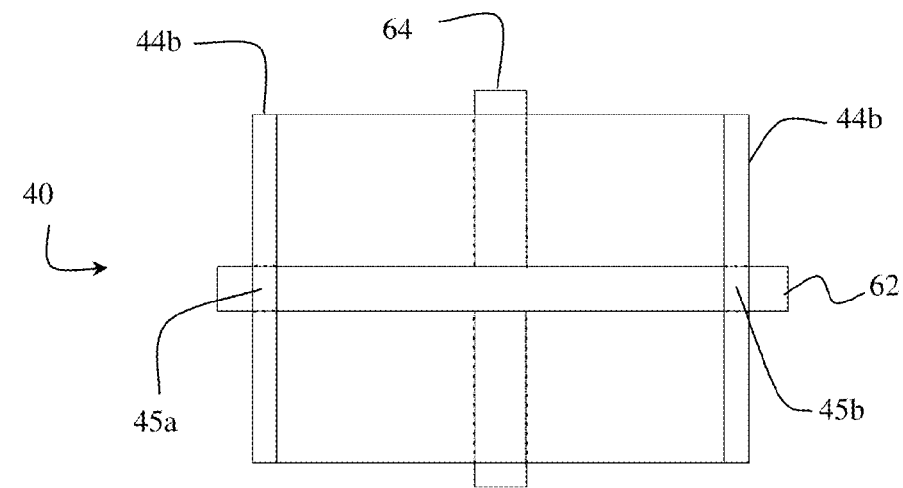
FIG. 6C is a top view of the middle bracket of an embodiment of the position detection assembly of the present invention.

Middle bracket 40, shown in FIGS. 6A (front view), 6B (side view), and 6C (top view) pivots approximately five degrees from center (leftward to rightward) on lower axle 64. Middle bracket 40 includes transverse supports (42a and 42b) and middle bracket side supports 44a and 44b. Middle bracket side supports 44a and 44b further include central bores 45a and 45b which receive upper axle 62. In the embodiment shown in FIGS. 6A-6C, middle bracket side supports 44a and 44b are positioned inwardly of upper bracket side supports (34a and 34b, FIGS. 5A-5C) when assembled. Transverse supports 42a and 42b further include central bores 47a and 47b which receive lower axle 64.

Figure 7A:
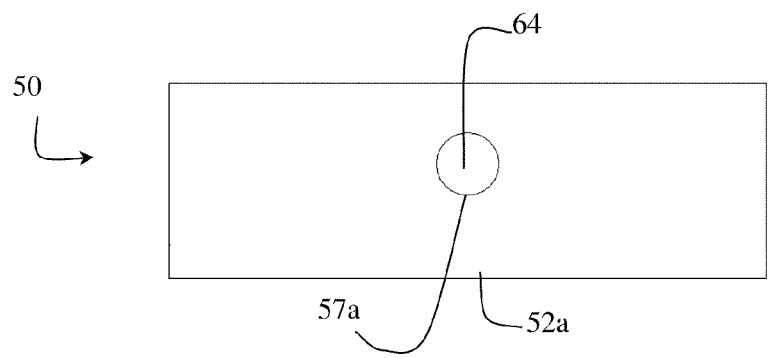
FIG. 7A is a front view of the lower bracket of an embodiment of the position detection assembly of the present invention.
Figure 7B:
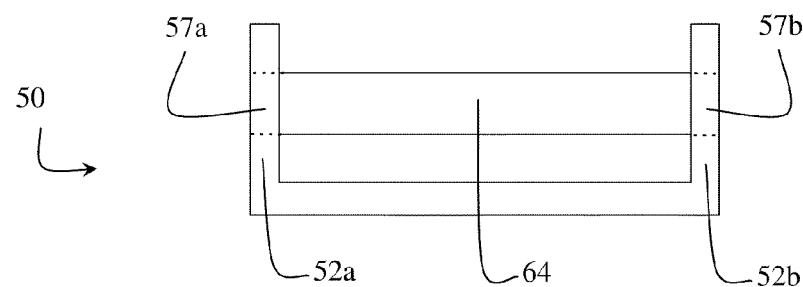
FIG. 7B is a side view of the lower bracket of an embodiment of the position detection assembly of the present invention.
Figure 7C:
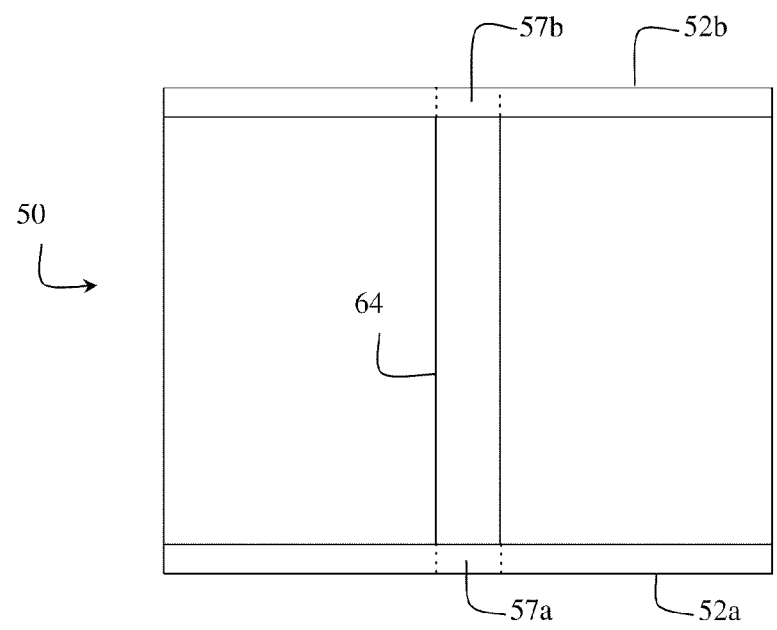
FIG. 7C is a top view of the lower bracket of an embodiment of the position detection assembly of the present invention.

Lower bracket 50, shown in FIGS. 7A (front view), 7B (side view), and 7C (top view) does not pivot. Lower bracket 50 includes transverse supports 52a and 52b. Transverse supports 52a and 52b further include central bores 57a and 57b which receive lower axle 64. In the embodiment shown in FIGS. 7A-7C, middle bracket transverse supports (42a and 42b, FIGS. 6A-6C) and positioned inwardly of lower bracket transverse supports 52a and 52b when assembled. In embodiments wherein an existing wheelchair is being retrofitted, lower bracket 50 may further include base plate 58 which supports transverse supports 52a and 52b and aids in the ease of installation.

The arrangement of components shown in FIGS. 4A-7C allows a tilt of about five degrees in each axis (forward/back via upper axle 62 and left/right via lower axle 64). This angle allows enough tilt to control the chair, but provides the stabilization necessary to prevent the user from losing balance in the chair. This angle, which is used in an illustrative embodiment, was chosen by measuring the angle of a standard chair in various degrees of tilt, as shown in FIG. 8. One of skill in the art will recognize that other angles, and/or ranges of movement can be incorporated.

Figure 8A:
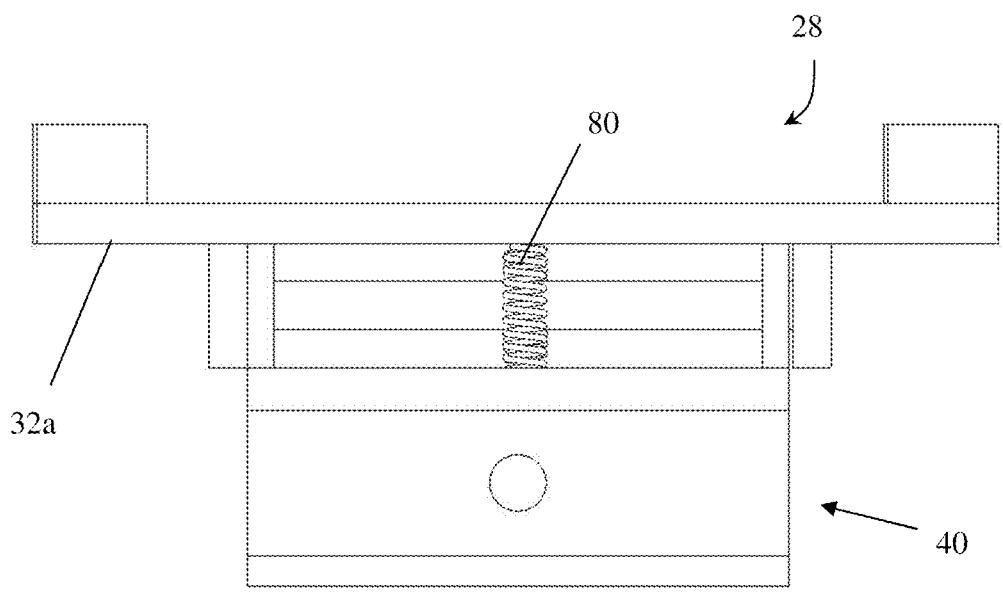
FIG. 8A is a front view of an embodiment of the position detection assembly of the present invention having a biasing system.
Figure 8B:
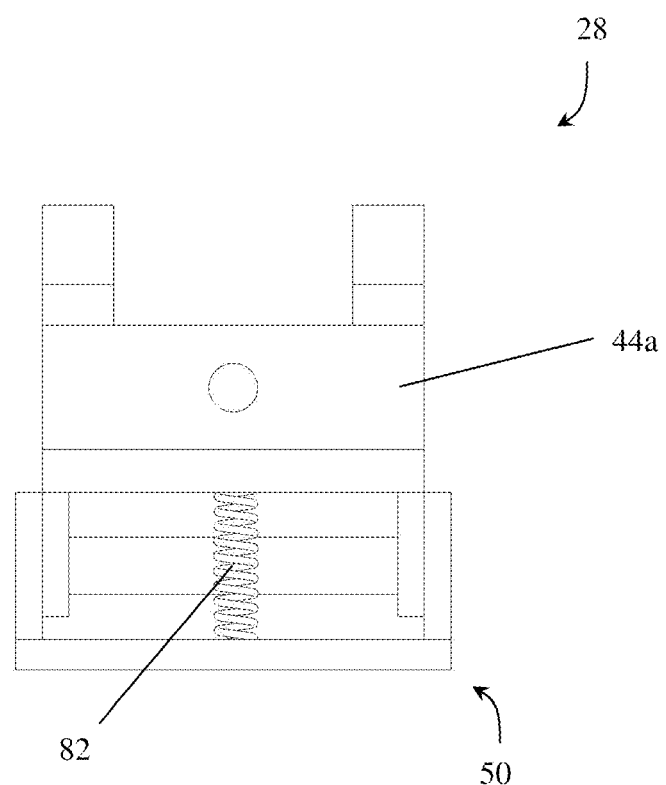
FIG. 8B is a side view of an embodiment of the position detection assembly of the present invention having a biasing system.

Position detection assembly 28 can also include a biasing system for returning the wheelchair seat to a centered position when force is not applied in any direction. In one embodiment, the biasing system includes four compression springs located in each of the four directions of tilt. Referring to FIG. 8A, spring 80 is disposed between transverse support 32a of top bracket 30 and middle bracket 40. A matching spring is similarly placed between transverse support 32b of top bracket 30 and middle bracket 40 (not shown). FIG. 8B shows spring 82 disposed between side support 44a of middle bracket 40 and bottom bracket 50. In an illustrative preferred embodiment, the maximum deflection of springs 80 and 82 is approximately ¼" during five-degree tilt. To keep the chair in the neutral position, these springs provide a constant upward force on the brackets. If an individual has limited upper body control, these springs will give feedback resistance to aid in returning the user to the neutral position. Spacers allow for an adjustment to the resistance of the springs depending upon the user's preference.

Position Detection Device

The position detection device is used to detect the position of seat 22. Movement of seat 22, rather than a joystick, creates the voltage signals which were then transmitted to the wheelchair controller. Movement of seat 22 along the x-axis (FIG. 3A) translates into leftward and rightward movement of the wheel chair. Movement of seat 22 along the y-axis translates into movement between forward and backward directions. If a user leans forward and to the left, the wheelchair will move forward and to the left. The output of the position detection device is preferably directly related to the angle of movement along each axis.

The position detection device can be a traditional inductive device, or can use modern non-contact devices such as magnetic proximity effect devices (Hall effect sensors), rotation sensors or fiber optic detection systems. The choice of position detection device will be apparent to one of skill in the art to match the intended use of the wheelchair.

EXAMPLE I

Figures 9, 10:
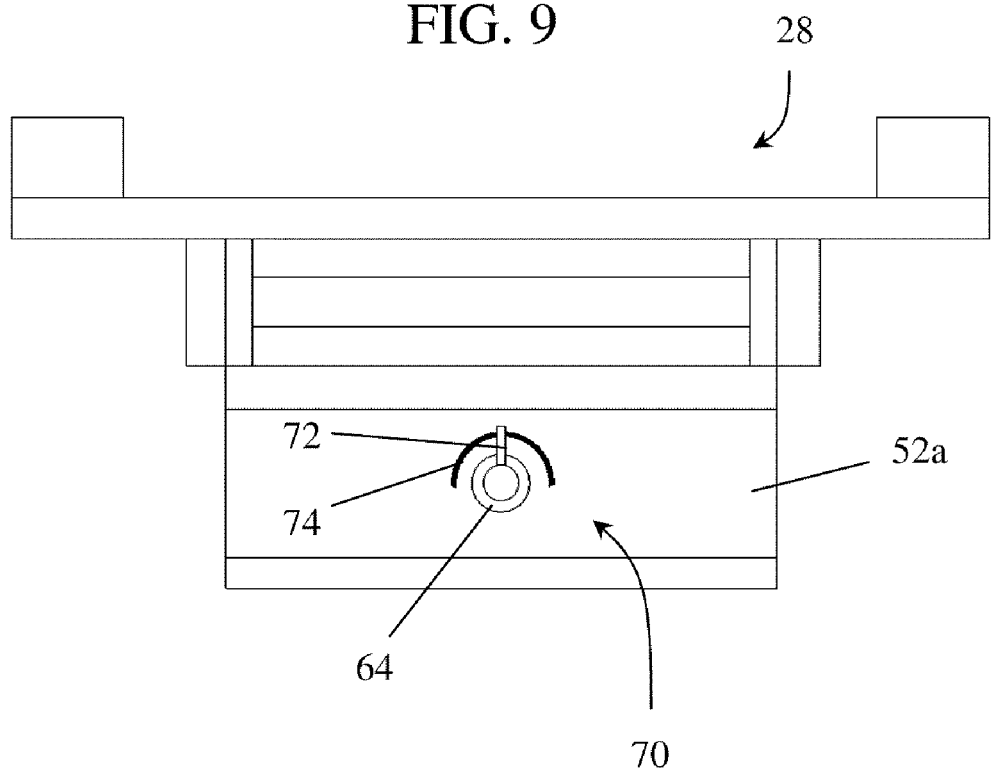
FIG. 9 is a front view of an embodiment of the position detection assembly of the present invention.
FIG. 10 is a table of the input voltages to the controller and the corresponding directional responses.

In a first embodiment, the position detection device is an inductive detection device. The wheelchair control system (not shown) of this embodiment receives input from the rotation of each axle. Similar to a conventional analog joystick, two potentiometers, or variable resistors, can be positioned on the upper and lower axles. FIG. 9 shows an illustrative arrangement wherein position detection device 70 includes contact arm 72 attached to one end of lower axle 64. Resistor track 74 is disposed on transverse support 52a or 52b to engage contact arm 72.

When the user shifts their body to left or right, contact arm 72 moves along resistor track 74 thereby increasing or decreasing the resistance acting on the current flowing through the circuit. Varying the resistance of detection device 70 alters the electrical current which translates the physical position of middle bracket 40 into an electrical signal. This electrical signal is then passed on to the wheelchair controller. In the same manner, a second position detection device can be attached to one end of the upper axle to detect movement when the user shifts their body from front to back.

The position detection device described above is analogous in operation to a conventional analog joystick. This example is illustrative of how the integration of existing position detecting devices with the invention can be contemplated by one of skill in the art.

EXAMPLE II

In another embodiment, the position detection device is a Hall-Effect sensor which provides a variable output voltage with a constant applied input voltage. An illustrative sensor is produced by Parker Power Components (model no. RS52 01621). The variable voltage is proportional to the change in magnetic field of the device, which is produced during the movement of the sensor. This magnetic field is perpendicular to the current.

In a Hall Effect sensor, electrons move perpendicularly through a magnetic field and experience a force which is normal to their directional forces. This is called the Lorentz Force. This force causes the electron's path to shift course and collect charges on one side of the material. This unbalanced charge creates an electric field. This electric field is what creates the Hall Voltage. A magnetic field is produced perpendicular to the current flow and when that field is rotated, the flow of current is altered.

The Hall-effect sensor is robust and can be exposed to dust, dirt, and water and not be affected. This makes the device more suitable for rugged use than a potentiometer or other electromechanical device. These sensors are reliable in outdoor setting by providing environmentally sealed components as well as an operating temperature range of −40° C. to 125° C. These sensors are commonly used in rotation and speed sensing applications.

Figure 11:
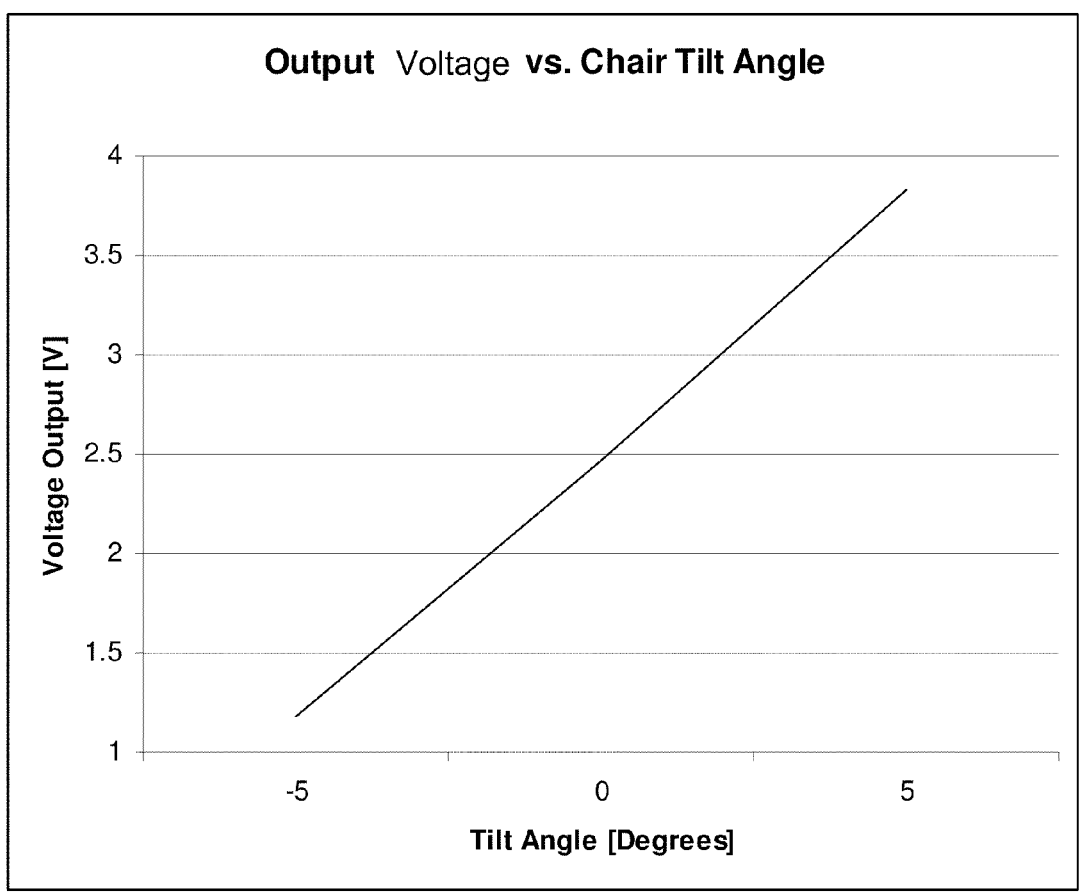
FIG. 11 is a graph showing the angle of seat tilt is directly proportional to the voltage output.

In this embodiment, two Hall-effect sensors provide the movement input to the wheelchair controller. Each sensor measures the tilt angle of the chair along the x or y axis. The voltage and directional response is given in FIG. 10. The input voltage is supplied from the wheelchair controller. This voltage is fed through the Hall effects sensors and outputs the following voltage shown. As shown in FIG. 11, the direction and speed of the chair are directly related by the output voltage. The output voltage is controlled by tilting the chair in any direction. As also shown in FIG. 11, the angle of seat tilt is directly proportional to the voltage output. This voltage output has an analog resolution which controls the speed and direction of the chair.

One sensor is mounted to one end of the upper axle and the other sensor is mounted to one end of the lower axle. These sensors use rotation as an input that causes a change in output voltage, giving it a variable voltage range from 0V to 10V (whereas only between about 1 and 4V are required for most operations). The signal from the sensors is sent to the wheelchair controller. These signals control the wheelchair in the respective direction.

An existing wheelchair was retro-fitted in constructing the prototype of the invention. The wheelchair used was a JAZZY™ 1120, manufactured by Pride Mobility Products Corporation. The signal voltage from the original joystick to the wheelchair controller was analyzed to find the voltage when the wheelchair was static as well as at full velocity in each direction to ensure that the Hall Effect sensors were mounted and aligned properly. It was found that the voltage signal for the power chair to be static (neutral position) was 2.47V for both the forward/backward signal and the left/right signal. In addition, when the forward/backward signal voltage was increased from 2.47V the wheelchair moved forward and as the signal voltage was decreased from 2.47V it moved backwards. The maximum voltage in the forward direction (maximum forward velocity) was 3.82V, while the maximum backward velocity occurred at 1.12V. Similarly, for the left/right signal voltage, any signal voltage between 2.47V and 3.82V caused the chair to turn in the right direction while a voltage between 2.47V and 1.12V caused the chair to move in the left direction. As the difference between the signal being sent from the rotation sensor and the neutral voltage of 2.47V increased, the speed also increased.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A control device for a mobility device, comprising:
   a lower bracket affixed to said mobility device;
   a lower roll axle pivotally connecting a middle bracket to said lower bracket;
   a first position sensor to generate a signal responsive to a position of said middle bracket along said lower roll axle;
   an upper pitch axle pivotally connecting a top bracket to said middle bracket;
   a second position sensor to generate a signal responsive to a position of said top bracket along said upper pitch axle;
   said lower roll axle being perpendicular to said upper pitch axle;
   said upper pitch axle being centered above said lower roll axle with both axles being below a user center of mass; and
   at least one controller to receive said signals generated by said first and second position sensors.

2. The device of claim 1, further comprising: said middle and top brackets being pivotal by about 5 degrees to either side of a neutral position.

3. The device of claim 1, further comprising: a biasing means for returning said top and middle brackets to a neutral position after pivotal movement thereof.

4. The device of claim 1, further comprising: said signal generated by said first and second position sensors being proportional to a degree of pivotal movement of said top and middle brackets.

5. The device of claim 1, further comprising: said first position sensor being connected to one end of said lower roll axle.

6. The device of claim 1, further comprising: said second position sensor being connected to one end of said upper pitch axle.

7. The device of claim 1, further comprising: said first and second sensors are selected from the group consisting of inductive sensors, electrical field sensor, Hall-Effect sensors, and fiber-optic sensors.

8. The device of claim 1, further comprising: said controller causes lateral movement of said mobility device responsive to a signal from said first position sensor.

9. The device of claim 1, further comprising: said controller causes forward or rearward movement of said mobility device responsive to a signal from said second position sensor.

10. The device of claim 1, further comprising: said controller causes increase or decrease in a speed of said mobility device responsive to a signal from said first position sensor.

11. The device of claim 1, further comprising: said controller causes increase or decrease in a speed of said mobility device responsive to a signal from said second position sensor.

* * * * *